United States Patent [19]

Uusitalo et al.

[11] 4,297,067
[45] Oct. 27, 1981

[54] METHOD AND APPARATUS FOR HANDLING PACKED LAYERS OF SUPPORT RODS IN AN ELECTROLYTIC REFINING PLANT

[75] Inventors: Leo Uusitalo, Tampere; Pertti Tuominen, Kaaro, both of Finland

[73] Assignee: Outokumpu Oy, Finland

[21] Appl. No.: 111,713

[22] Filed: Jan. 14, 1980

[51] Int. Cl.³ .............................................. B65G 59/02
[52] U.S. Cl. .................................. 414/114; 414/118; 414/786
[58] Field of Search ........................ 414/114, 117–119, 414/786; 204/198, 285, 297 W

[56] References Cited

U.S. PATENT DOCUMENTS 3,327,872  6/1967  Madden ................................ 414/119
4,231,697 11/1980  Franz ..................................... 414/89

*Primary Examiner*—Robert W. Saifer
*Attorney, Agent, or Firm*—Steinberg & Raskin

[57] ABSTRACT

Method and apparatus for handling support rods of cathode plates which have been packed in layers in a transporting and storage crate in an electrolytic refining plant include moving the layer or group of support rods which is uppermost in the transporting and storage crate in a longitudinal direction by means of a pusher member onto a platform located above a seed plate machine, moving the group of support rods in the transverse direction by means of a transporting device onto a rod distribution magazine and then raising the groups or layers of support rods which still remain in the transporting and storage crate upwardly by means of a lifting device until the uppermost group or layer of support rods in the supporting and storage crate is appropriately located at the proper height for the subsequent movement of the new uppermost group or layer of support rods onto the platform located above the seed plate machine.

9 Claims, 2 Drawing Figures

METHOD AND APPARATUS FOR HANDLING PACKED LAYERS OF SUPPORT RODS IN AN ELECTROLYTIC REFINING PLANT

BACKGROUND OF THE INVENTION

This invention relates generally to methods and apparatus for handling packed layers of support rods in an electrolytic refining plant and, more particularly, to such methods and apparatus wherein groups of support rods are delivered to a magazine for distributing the support rods singly to each seed plate.

In electrolytic refining plants such, as electrolytic copper refining plants, the support rods of the cathode plates normally circulate within the refining plant. More particularly, after the cathode plates have grown sufficiently thick during the refining process as will be understood by those skilled in the art, the plates are removed from the tanks whereupon the support rods therefor are detached with new seed plates being suspended from the same support rods.

German Pat. No. 1,188,299 and Finnish Pat. No. 46 266 disclose procedures and apparatus for mechanizing the manufacturing of the cathode plates. More particularly, in the method disclosed in German Pat. No. 1,188,299, the support rods are manually handled during such manufacture while in the method disclosed in Finnish Pat. No. 46 266, the seed plate manufacturing line and the cathode plate dismounting line are necessarily located parallel to each other in side by side relationship. Further, the spacing between the seed plate manufacturing line and the cathode plate dismounting line is necessarily quite close and, consequently, the apparatus and equipment of the refining plant must be located in a precisely and rigidly specified manner and, additionally, the space requirements in such refining plants are necessarily high.

In applicants' U.S. patent application Ser. No. 111,641 filed simultaneously herewith, a method and apparatus are disclosed for handling support rods in an electrolytic refining plant which are detached from the cathode plates. In the method disclosed therein, the support rods which are detached from the cathode plates are transported in the longitudinal direction on a longitudinally extending transport track to a support rod grouping station where the support rods are arranged to form a group of support rods of a predetermined size. Such arrangement is accomplished by moving the support rods at the grouping station in a transverse direction so that a side by side closely packed relationship is obtained. Each group of support rods is then packed in a transporting and storage crate, each group constituting a layer of support rods therein.

Significant advantages are obtained utilizing this method. For example, the mutual location of the seed plate manufacturing machine, the cathode plate dismounting machine and the electrolysis tank hall can be varied within relatively wide limits so that efficient utilization of transporting equipment, cranes as well as available space can be obtained, especially in the case where older refining plants are being modernized. Secondly, the storage of the support rods which is necessary in order to correspond with the running speed of the machine is accomplished with the aid of the transporting and storing crates with a remarkably low cost and high space economy. Further, the work involved in piling the supporting rods which conventionally required strenuous manual labor, is virtually eliminated and apart from the operators in charge of the hoisting and transporting means, only supervisory personnel are required in the practice of the method.

SUMMARY OF THE INVENTION

One object of the present invention is to provide a method and apparatus by which groups of support rods which have been packed in layers in a storage crate can be easily tipped over a rod distribution machine located at the seed plate manufacturing machine from which the distribution magazine can deliver the support rods, one by one, to each seed plate.

Briefly, in accordance with the present invention, this and other objects are attained by providing a method and apparatus wherein the support rod group which constitutes the uppermost layer in the transporting and storage crate is longitudinally moved by transferring means equipped with a pusher member onto a platform which is located above the seed plate machine whereupon the support rod group is moved transversely by a transporting device onto a rod distribution machine. The groups or layers of support rods which still remain in the transporting and storage crate are then moved upwardly by means of a lifting device until the uppermost group or layer of support rods is raised to an appropriate height for being engaged by the pusher device so that the next layer or group can be moved onto the platform located above the seed plate machine.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which.

DESCRIPTION OF THE PREFERRED EMBODIMENT

Figure 1:
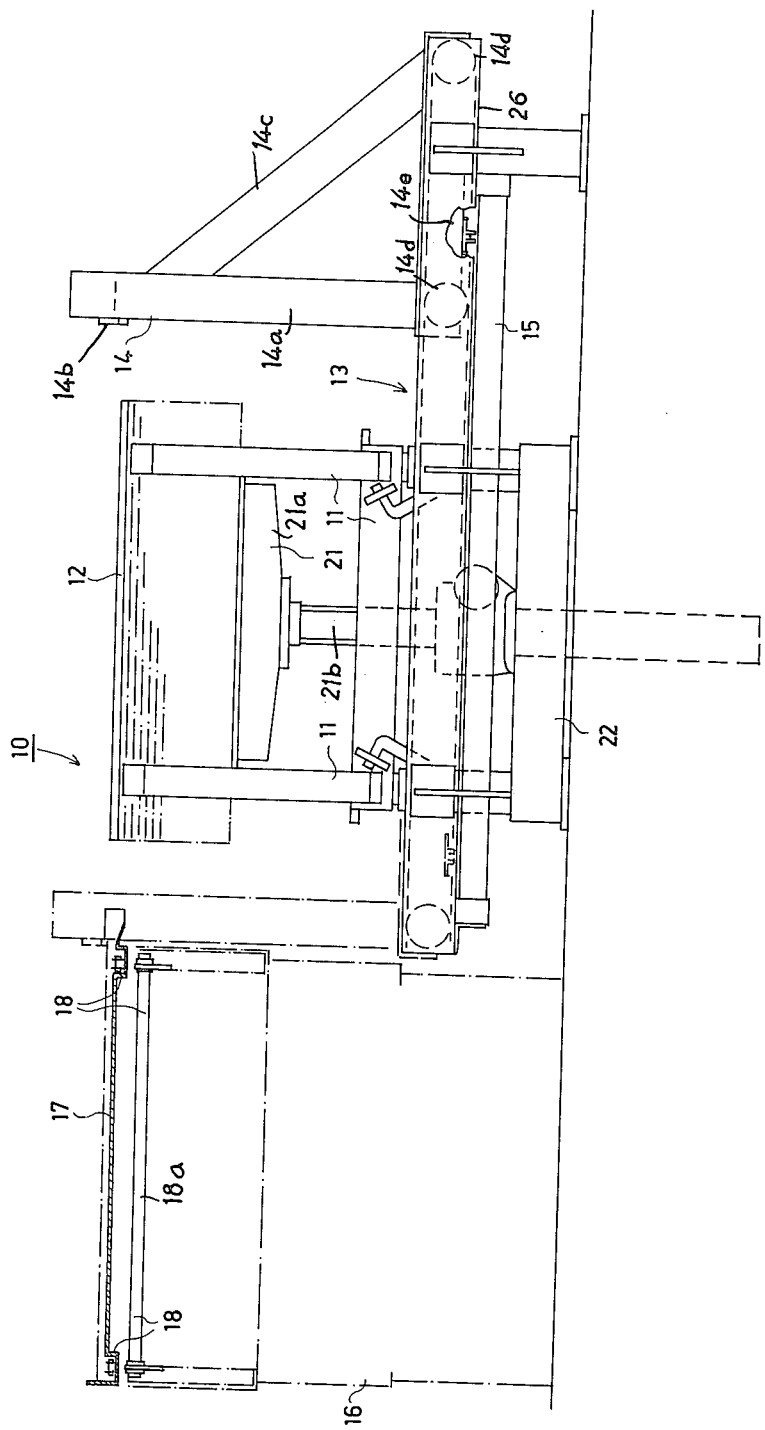
FIG. 1 is a side elevation view of one embodiment of the apparatus of the present invention for carrying out the method of the present invention.

Referring now to the drawings wherein like reference characters designate identical or corresponding parts throughout the several views, the apparatus of the invention, generally designated 10, comprises transferring apparatus 13 including a pusher member 14 which is adapted to push the uppermost group or layer of support rods 12 of a plurality of layers thereof disposed within a transporting and storage crate in a longitudinal direction. Thus, the pusher member 14 comprises a U-shaped frame 14a having an upper horizontally extending cross member 14b. The frame 14a is supported in an upright position by a pair of support members 14c. The lower ends of frame 14a and support members 14c have rollers 14d rotatably affixed thereto which travel in guide slots 25 defined within a pair of longitudinally extending beams 26. Activating apparatus in the form of a pair of hydraulic or pneumatic power cylinders 15 have one end fixed to a forward cross member 27 and their other ends attached to respective beams 14e (FIG. 1) constituting a part of the transferring apparatus 13. Thus, activation of the power cylinders 15 cause the pusher member 14 to reciprocate between the solid and dashed line positions illustrated in FIG. 1.

A platform 17 is located at the forward end of the transferring apparatus 13 at substantially the same height as the cross member 14b of the pusher member 14. The platform 17 is located above a seed plate machine diagramatically indicated at 16 and is adapted to receive the uppermost layer or group of supporting rods 12 which are pushed onto it by pusher member 14.

The apparatus 10 further comprises a transporting assembly 18 which is adapted to move in a transverse direction the group or layer of support rods 12 which has been pushed onto the platform 17 to a rod distribution magazine 19. The rod distribution magazine includes a rod distributor 20 which is adapted to deliver individual support rods 12 to each seed plate which is to be prepared.

A lifter device 21 is located between the beams 26 of the transferring apparatus 13 which is adapted to lift the layers or groups of supporting rods located in the transporting and storage crate 11 subsequent to the pusher member 14 pushing the uppermost rod group onto platform 17. The lifter device 21 preferably comprises a table 21a to which a vertically movable column 21b is attached at its upper end, the frame for the lifter device 21 being designated 22.

Figure 2:
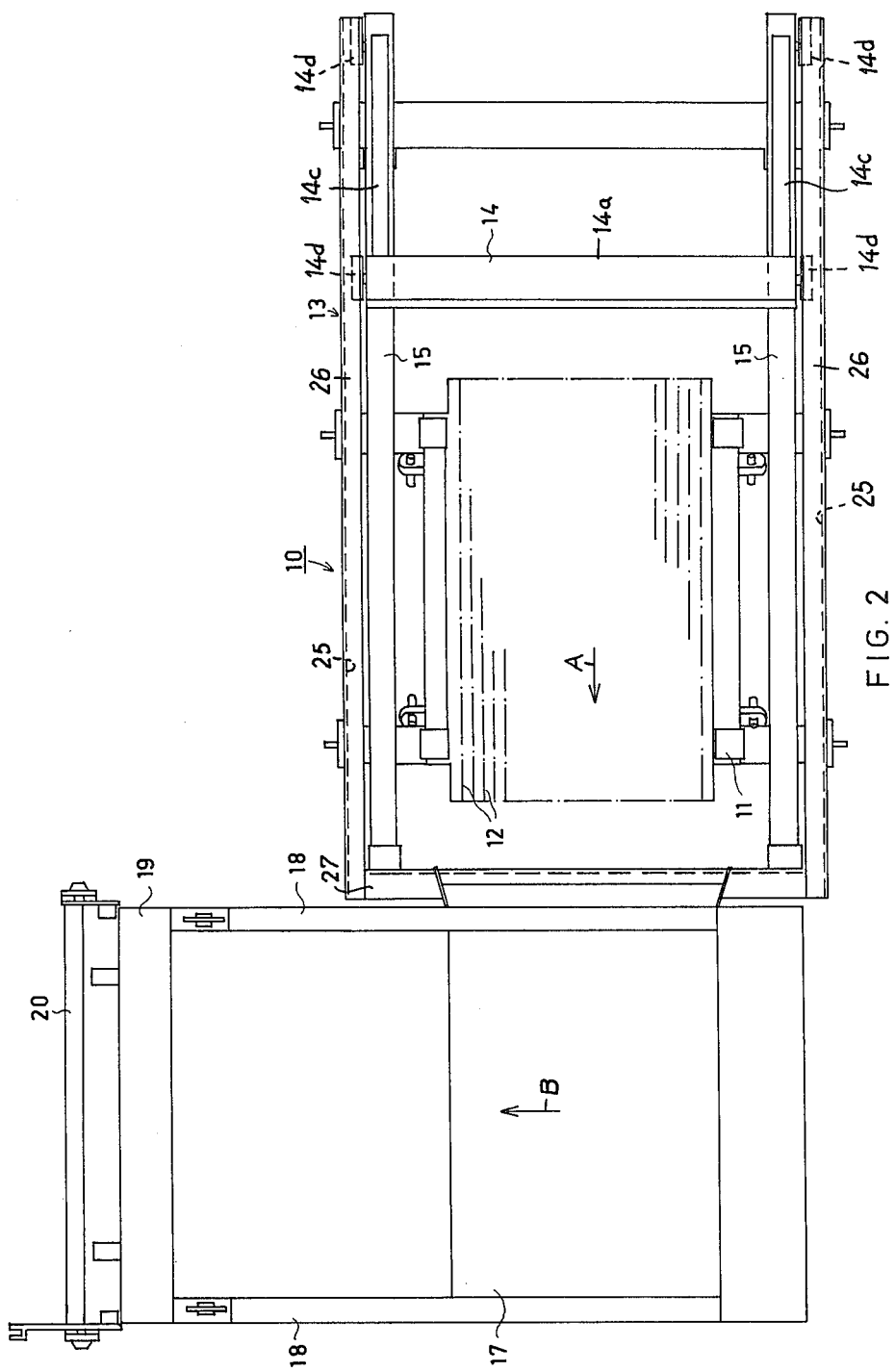
FIG. 2 is a plan view of the apparatus illustrated in FIG. 1.

The apparatus of the present invention operates in the following manner. The transporting and storage crate 11 which has been filled with a plurality of groups or layers of support rods such as in the manner described in applicants' copending patent application Ser. No. 111,641 filed simultaneously herewith, which layers or groups have been packed one above the other, is transported by means of a crane, fork truck or similar means to the area of the seed plate manufacturing machine. The transporting and storage crate 11 is positioned on the lift table 21a and locked to its frame 22. The table 21a is vertically located such that the uppermost or top layer or group of support rods is located on substantially the same horizontal plane as the cross member 14b of pusher member 14. Thus, the pusher member 14 of the transferring apparatus 13 is moved to the left as seen in FIG. 1 so that the cross member 14b engages and moves the uppermost layer or group of support rods 12 onto the platform 17 which, as described above, is located above the seed plate machine. Thus, the pusher member 14 moves to the position illustrated by the dashed lines in FIG. 1. In this manner, the upper group of support rods 12 is moved in the longitudinal direction as indicated by the arrow A in FIG. 2. The transporting assembly 18 then transports the group of support rods which has been moved onto the platform 17 onto the rod distribution magazine 19. Thus, the transporting machine 18 preferably comprises a rod 18a which extends parallel to the support rods 12 of the group located on the platform 17 and which is movably mounted so as to engage the last support rod thereof to push the group of support rods onto the rod distribution magazine 19. A rod distributor 20 distributes each of the supporting rods 12 from the magazine 19 one by one to respective seed plates which are to be prepared. The transverse direction in which the group of support rods is moved from the support platform 17 to the rod distribution magazine 19 is designated by arrow B in FIG. 2.

The lift table 21 which is controlled by a photoelectric cell or other control apparatus, raises the plurality of groups of support rods located in the transporting and storage crate 11 upwardly subsequent to each uppermost group of support rods being moved as described above. Thus, the lift table 21 indexes upwardly after each moving operation until the new uppermost group of support rods is located at the same vertical height as the cross member 14b of pusher device 14. The same procedure described above wherein the new uppermost group of support rods is moved longitudinally onto the platform 17 from where it is moved onto the rod distribution magazine 19 in a transverse direction for distribution to respective seed plates is then repeated until the transporting and storage crate 11 is empty. At this time, the empty crate 11 is removed and replaced with a full crate.

Obviously, numerous modifications and variations of the present invention are possible in the light of the above teachings. For example, the group of support rods can be moved between platform 17 and rod distribution magazine 19 by other means than that shown such, for example, as by tilting platform 17 with power cylinders (not shown) as described in Finnish Patent publication No. 46 266.

Of course, it is understood that the invention can be practiced within the scope of the appended claims in manners other than those specifically described above.

What is claimed is:

1. A method for handling a plurality of groups of support rods which have been stacked in layers within a transporting and storage crate in an electrolytic refining plant comprising the steps of:
   moving the uppermost group of support rods of the plurality of stacked layers thereof in a longitudinal direction onto a platform located above a seed plate machine;
   moving the group of support rods which has been moved onto the platform in a transverse direction onto a rod distribution magazine;
   moving the remaining plurality of groups of support rods upwardly until the height of the new uppermost group of support rods in the transporting and storage crate is at the same height as the initially uppermost group of support rods; and
   continuously repeating the moving steps.

2. The method recited in claim 1 wherein said transverse moving step comprises moving the group of support rods by a transporting assembly onto the rod distribution magazine.

3. The method recited in claim 1 wherein said transverse moving step comprises moving the groups of support rods by tilting the platform.

4. Apparatus for handling a plurality of groups of support rods which have been stacked in layers within a transporting and storage crate in an electrolytic refining plant comprising:
   transferring means including a pusher member for pushing the uppermost group of supporting rods of the plurality of stacked layers thereof in a longitudinal direction onto a platform located above the seed plate machine;
   a platform located above a seed plate machine adjacent the transferring means adapted to receive the group of support rods pushed by the pusher member of the transferring means;
   transporting means for moving the support rod group which has been moved onto the platform onto a rod distribution magazine; and
   lifting means for lifting the remaining groups of support rods upwardly until the height of the new uppermost group of support rods in the transporting and storage crate is at the same height as the initially uppermost group of support rods.

5. Apparatus as recited in claim 4 further including activating means coupled to said pusher member for reciprocating the same.

6. Apparatus as recited in claim 5 wherein said activating means comprises one of hydraulic and pneumatic power cylinder.

7. Apparatus as recited in claim 4 wherein said lifting means comprises a table and means for vertically moving the same.

8. Apparatus as recited in claim 7 further including control means for controlling the upward movement of the table.

9. Apparatus as recited in claim 8 wherein said control means comprises a photoelectric cell.

* * * * *